United States Patent [19]

Tsang

[11] Patent Number: 4,771,349
[45] Date of Patent: Sep. 13, 1988

[54] MAGNETORESISTIVE READ TRANSDUCER

[75] Inventor: Ching Hwa Tsang, Sunnyvale, Calif.

[73] Assignee: International Business Machine Corporation, Armonk, N.Y.

[21] Appl. No.: 926,148

[22] Filed: Oct. 31, 1986

[51] Int. Cl.$^4$ .............................................. G11B 5/39
[52] U.S. Cl. ................................................... 360/113
[58] Field of Search ...................... 324/252; 338/32 R; 360/113, 123, 125, 126

[56] References Cited

U.S. PATENT DOCUMENTS

| | | | |
|---|---|---|---|
| 3,864,751 | 6/1977 | Beaulieu et al. | 360/113 |
| 3,887,944 | 6/1975 | Bajorek et al. | 360/113 |
| 4,103,315 | 6/1977 | Hempstead et al. | 360/110 |
| 4,242,710 | 12/1980 | Hempstead et al. | 360/113 |
| 4,535,375 | 1/1983 | Mowry et al. | 360/113 |
| 4,626,946 | 12/1986 | Vinal | 360/113 |
| 4,649,447 | 3/1987 | Huang et al. | 360/113 |
| 4,663,684 | 5/1987 | Kamo et al. | 360/113 |
| 4,668,913 | 5/1987 | Vinal | 360/113 X |
| 4,713,708 | 12/1987 | Krounbi et al. | 360/113 |

Primary Examiner—Stuart N. Hecker
Assistant Examiner—Benjamin E. Urcia
Attorney, Agent, or Firm—Otto Schmid, Jr.

[57] ABSTRACT

A magnetoresistive (MR) read transducer assembly in which the thin film MR layer is longitudinally biased directly only in the end regions by exchange bias developed by a thin film of antiferromagnetic material that is deposited in direct contact only in the end regions of the MR layer. A thin film of soft magnetic material extends across only the central region of the MR layer. However, the thin film of soft magnetic material is separated from the MR layer by a decoupling layer which interrupts the exchange coupling so that transverse bias is produced only in the central region upon connection of a bias source to spaced conductor leads which are connected to the MR layer. The transverse bias is produced in that part of the central region of the MR layer in which the bias current and the decoupling layer are both present. Upon connection of a signal sensing means to the conductor leads, an output signal is sensed which detects resistance changes in the MR layer as a function of the fields which are intercepted by the MR layer.

6 Claims, 1 Drawing Sheet

MAGNETORESISTIVE READ TRANSDUCER

BACKGROUND OF THE INVENTION

1. Field of the Invention

This invention relates in general to magnetic transducers for reading information signals from a magnetic medium and, in particular, to an improved magnetoresistive read transducer.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and direction of magnetic flux being sensed by the element.

In the past, principal problems with the MR sensors of unstable operating characteristics and Barkhausen noise have limited their use. These problems arise because there generally exist more than one stable state for the magnetization, a degeneracy which typically produces various multi-domain configurations. Random changes in this configuration are the cause of the above-mentioned unstable operating characteristics and Barkhausen noise.

The conceptual solution to these prior art problems was attained only recently through the implementation of patterned longitudinal bias. This solution is described and claimed in the commonly assigned patent application entitled Magnetoresistive Read Transducers by Ching H. Tsang, Ser. No. 766,157, filed 8-15-85 now U.S. Pat. No. 4,663,685. Briefly, this invention advocates the creation of appropriate single domain states directly in the end regions only of the MR layer. This can be achieved by producing a longitudinal bias in the end regions only of the MR layer to maintain the end regions in a single domain state and these single domain states induce a single domain state in the central region of the MR layer. In a specific embodiment of this concept, a thin film of soft magnetic material is provided parallel to, but spaced from, the MR layer to also produce a transverse bias in the central region only of the MR layer to maintain the central region, where the output signal is sensed, in a linear response mode.

The introduction of the soft magnetic material, in the above-discussed specific embodiment, however, may create additional magnetic issues. Specifically, as this embodiment induces a single domain state only in the end regions of the MR layer but leaves the domain state in the end regions of the soft magnetic bias film undefined the total amount of magnetic flux coming in from the passive end regions is still undefined and some unstable operating characteristics and Barkhausen noise may still occur.

SUMMARY OF THE INVENTION

It is therefore the principal object of this invention to maintain the magnetization within the passive end regions of the MR sensor in a single domain state, so as to keep at a constant value the magnetic flux entering the central active region of the MR sensor from the passive end regions. In accordance with the invention, the objective is achieved by localizing the soft magnetic bias layer to the place where it is needed, i.e. the active central region, to produce a transverse bias, while producing a longitudinal bias directly in the passive end regions of the MR layer of a level sufficient to maintain the end regions in a single domain state.

In a specific embodiment, the magnetic read transducer assembly comprises a thin film of magnetoresistive (MR) conductive layer formed of magnetic material and a decoupling layer covering the central region of the MR conductive layer. A thin film of soft magnetic material extends over only the central region of the MR conductive layer and in contact with the decoupling layer so that the film of soft magnetic material is separated from the MR conductive layer in the central region of the MR conductive layer. Means are provided to produce a longitudinal bias directly in the end regions only of the MR layer of a level sufficient to maintain the end regions of the MR conductive layer in a single domain state with the single domain state of the end regions inducing a single domain state in the central region of the MR conductive layer.

In a specific embodiment, the means for producing a longitudinal bias comprises a thin film of antiferromagnetic material which is in direct contact with the end regions only of the MR conductive layer. Spaced conductor means are connected to the MR conductive layer within the central region. A current source is provided for supplying a bias current to the conductive means to magnetically bias the MR layer with transverse bias of a level sufficient to maintain the MR layer in a high sensitivity condition so that, upon connection of the conductive means to a signal sensing means, the signal sensing means determines the resistance changes in the MR layer as a function of the fields which are intercepted by the layer.

DESCRIPTION OF THE PREFERRED EMBODIMENTS

Figure 1:
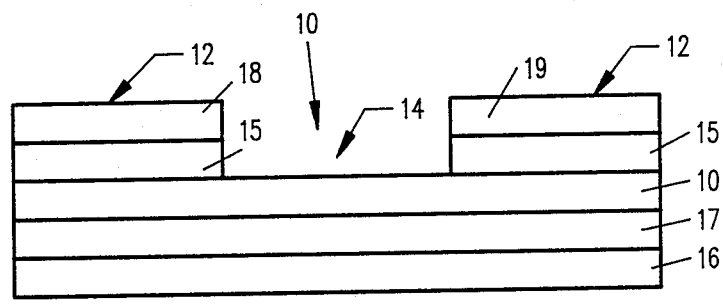
FIG. 1 is an end view of a specific embodiment of a prior art magnetoresistive read transducer assembly.

Prior to describing the present invention, a specific embodiment of the previously identified invention will be described briefly in conjunction with FIG. 1. The magnetic read head 11 utilizes a magnetoresistive (MR) sensor 10, and the MR sensor can be divided into two regions, the active region 14, where actual sensing of data is accomplished, and end regions 12. The invention recognizes that the two regions should be biased in different manners with longitudinal bias only in the end regions 12 and transverse bias in the active region 14. The longitudinal bias is produced, in this specific embodiment by antiferromagnetic exchange bias layer 15 which is deposited to be in direct physical contact with MR layer 10. The transverse bias is produced by soft magnetic film layer 16 which is separated from MR layer 10 by a thin nonmagnetic spacer layer 17 whose purpose is to prevent, within the active central region, a magnetic exchange coupling between the MR layer and the soft magnetic film layer 16. The distance between the inner edges of conductors 18 and 19 comprise the detection region over which the output signal is sensed.

This invention is based on the premise that with the end regions 12 in a single domain state, the central region 14 is forced into a single domain state so long as the longitudinally unbiased central region is not too long in comparison to the height of the sensor. This sensor design has been demonstrated to provide much more stable operating characteristics and suppression of Barkhausen noise than prior art designs without exchange biasing provisions, while at the same time not adversely affecting sensor sensitivity as with prior art designs having continuous exchange bias over the active and passive MR sensor segments.

The present invention will now be described with reference to FIG. 2, in which the magnetic read head 20 utilizes a magnetoresistive (MR) sensor 22, and the MR sensor 22 is provided with longitudinal bias for domain suppression applied only to the end regions 24 and is provided with transverse bias for a linear response mode only in the central region 26 of the MR sensor 22. The active read region, over which the output signal is sensed, corresponds to the part of the central region 26 which is provided with transverse bias.

The MR sensor 22 is first deposited over both end regions 24 and central region 26. The spacer layer 28 is formed only in the central region 26 and soft magnetic film layer 30 is formed in the central region 26 only over the spacer layer 28 so that a transverse bias can be produced only in the central region 26 of the MR sensor 22 to produce a linear response mode in MR sensor 22. An antiferromagnetic layer 32 is formed only in the end regions. Antiferromagnetic layer 32 creates an interfacial exchange interaction with the MR sensor 22 that results in an effective bias field experienced by the MR sensor 22, and this bias field is oriented longitudinally for domain suppression. Conductor leads 34 and 36, over which the output signal is sensed, are deposited only in the end regions 24 over the antiferromagnetic layer 32. The position of the MR sensor 22 and the soft magnetic film layer 30 can be reversed, if desired.

A bias current source 38 is connected between conductor leads 34 and 36 to produce a bias current in the central region 26 of the MR sensor 22 to magnetically bias the MR sensor with transverse bias. The transverse bias is produced in that part of the central region 26 of the MR sensor 22 in which the bias current and the spacer layer 28 are both present. The transverse bias produces magnetization at a chosen angle in the central region 26 of the MR sensor 22 so that the MR sensor 22 is maintained in a high sensitivity condition.

Note that, in the present invention, both the soft magnetic film 30 and the spacer layer 28 extend only over the central region 26 of the MR sensor 22 in contrast to the FIG. 1 embodiment in which those elements are continuous over the entire length of the MR sensor 10.

The magnetic read head embodying the present invention can be fabricated by any suitable method known to those skilled in the art. As is known in the art, the surface of the MR sensor 22 in the end regions 24 must be clean prior to deposition of the antiferromagnetic layer 32 to insure the interfacial exchange interaction with the MR sensor 22 which results in an effective longitudinal bias field. This clean surface can be provided by a suitable cleaning, etching or other treatment to provide a clean surface in the end regions 24 of the MR sensor 22.

Figure 2:
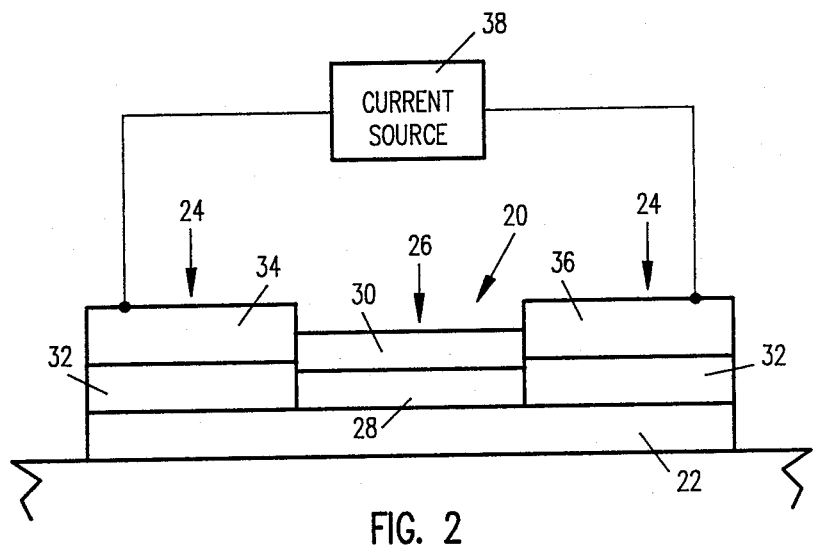
FIG. 2 is an end view of a specific embodiment of a magnetoresistive read transducer assembly according to the present invention.

In a specific embodiment of the magnetic read head shown in FIG. 2, the MR sensor 22 material was NiFe, the spacer layer 28 material was Ta, the soft magnetic film layer 30 was NiFeRh, and the antiferromagnetic layer 32 material was MnFe.

It can be seen that the magnetic read head embodying the present invention has a soft film bias structure exclusively in the active central region of the head thereby eliminating the end regions of the soft bias film and also eliminating domain noise and side-reading problems which may otherwise occur. In addition, the longitudinal exchange bias exists exclusively in the end regions for domain suppression, so it can be seen that the structure of the magnetic read head embodying the present invention yields superior operative characteristics.

While the invention has been particularly shown and described with reference to preferred embodiments thereof, it will be understood by those skilled in the art that various other changes in the form and details may be made therein without departing from the spirit and scope of the invention.

Having thus described our invention, what we claim as new, and desire to secure by Letters Patent is:

1. A magnetic read transducer assembly comprising:
   a thin film of magnetoresistive conductive layer formed of magnetic material, said magnetoresistive conductive layer having end regions separated by a central region;
   a nonmagnetic decoupling layer covering only said central region of said magnetoresistive conductive layer;
   a thin film of soft magnetic material extending over said central region only of said magnetoresistive conductive layer, said thin film of soft magnetic material being parallel to and in contact with said decoupling layer and separated from said magnetoresistive layer in said central region by said decoupling layer;
   means for producing a longitudinal bias directly in said end regions only of said magnetoresistive layer of a level sufficient to maintain said end regions of said magnetoresistive conductive layer in a single domain state, said single domain states of said end regions thereby inducing a single domain state in said central region;
   spaced conductive means connected to said magnetoresistive layer; and
   means for supplying a bias current to said conductive means to magnetically bias said magnetoresistive layer with transverse bias of a level sufficient to maintain said magnetoresistive layer in a high sensitivity condition whereby, upon connection of said conductive means to a signal sensing means, said signal sensing means determines the resistance changes in said magnetoresistive layer as a function of the fields which are intercepted by said magnetoresistive conductive layer.

2. The magnetic read transducer assembly of claim 1 wherein said thin film of magnetoresistive conductive layer is NiFe.

3. The magnetic read transducer assembly of claim 1 wherein said means for producing a longitudinal bias in said end regions only of said magnetoresistive layer comprises a thin film of antiferromagnetic material in direct contact with said end regions of said magnetoresistve conductive layer to produce exchange coupling between said antiferromagnetic material and said end regions of said magnetoresistive conductive layer.

4. The magnetic read transducer assembly of claim 3 wherein said thin film of antiferromagnetic material is MnFe.

5. The magnetic read transducer assembly of claim 1 wherein said thin film of soft magnetic material is NiFeRh.

6. The magnetic read transducer assembly of claim 1 wherein said decoupling layer is Ta.

* * * * *